Sept. 9, 1924.                                                              1,508,220
                                    E. FREY
                          VARIABLE SPEED TRANSMISSION
                            Filed Sept. 14, 1922       3 Sheets-Sheet 1
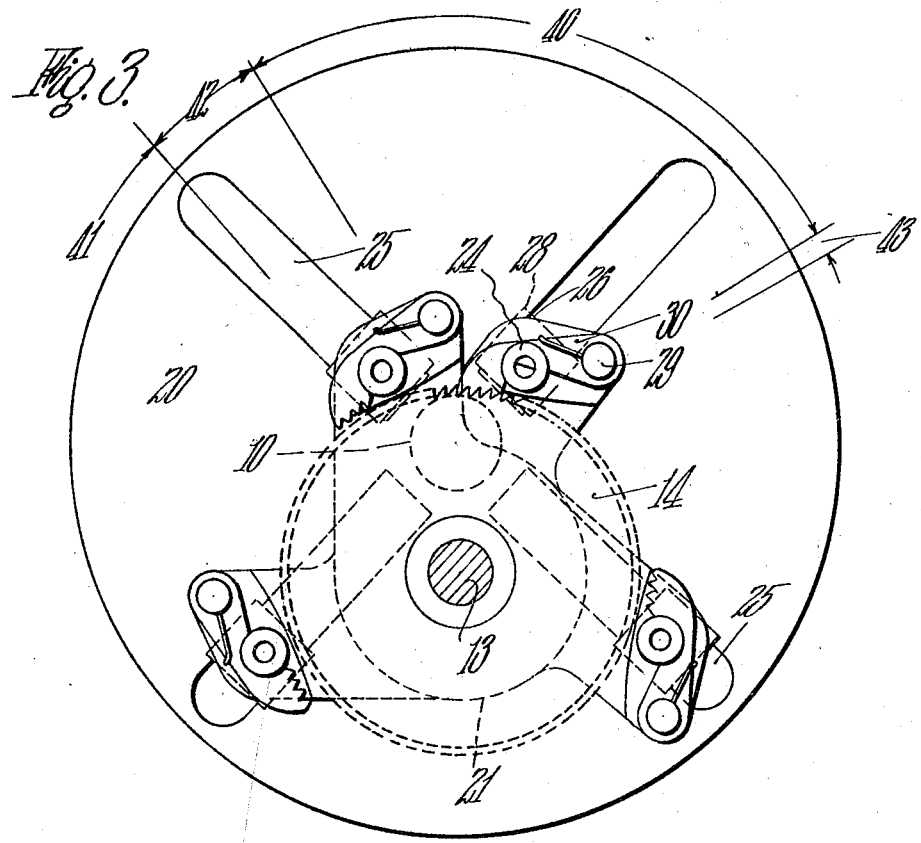
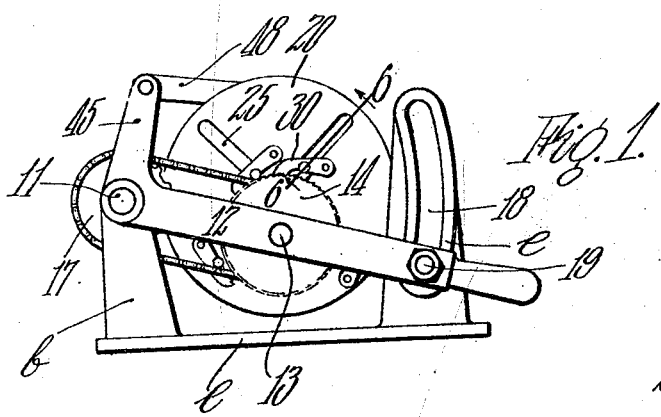
INVENTOR
Ellsworth Frey
BY Chapin & Neal
ATTORNEYS

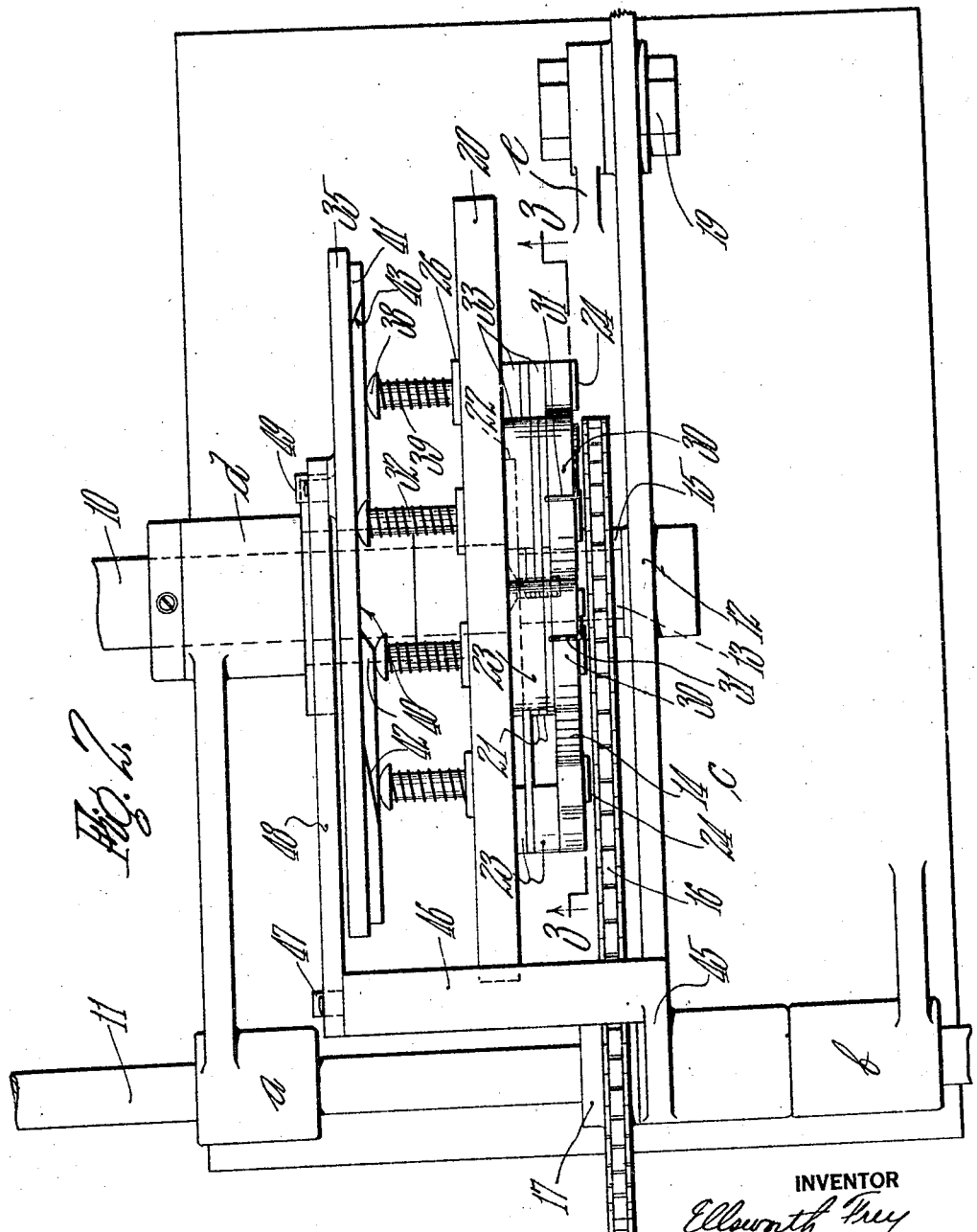

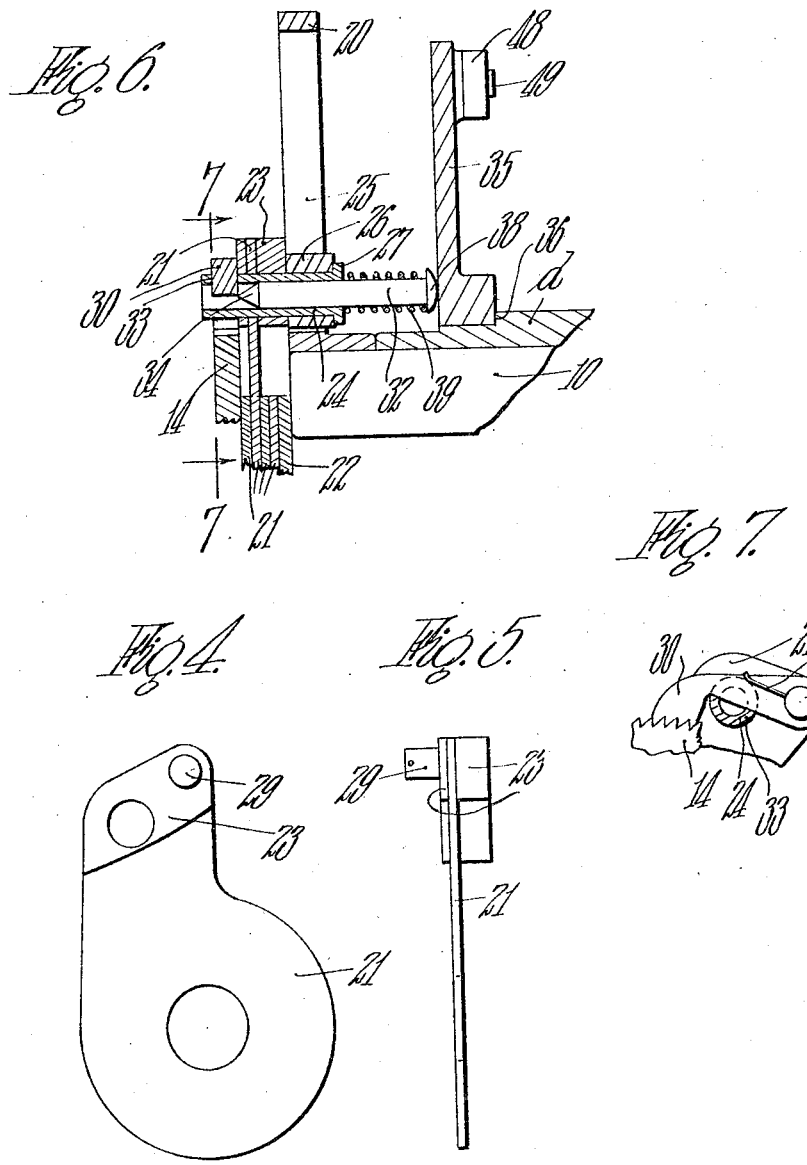

Patented Sept. 9, 1924.

1,508,220

UNITED STATES PATENT OFFICE.

ELLSWORTH FREY, OF SPRINGFIELD, MASSACHUSETTS, ASSIGNOR TO FREY VARIABLE SPEED GEAR COMPANY, A CORPORATION OF MASSACHUSETTS.

VARIABLE-SPEED TRANSMISSION.

Application filed September 14, 1922. Serial No. 588,269.

*To all whom it may concern:*

Be it known that I, ELLSWORTH FREY, a citizen of the United States, residing at Springfield, in the county of Hampden and State of Massachusetts, have invented new and useful Improvements in Variable-Speed Transmissions, of which the following is a specification.

This invention relates to variable speed transmissions and, more particularly, to transmissions of the type wherein the driving and driven members are connected by positive, as distinguished from frictional, means.

An example of the general type of transmission, with which this invention is concerned, will be found in my prior United States Letters Patent No. 1,263,546, granted April 23, 1918.

The object of this invention is to simplify and improve the transmission disclosed in my prior patent and render it less expensive to manufacture.

With this and other objects in view, the invention consists in the various features of construction and in the combinations and arrangement of parts, hereinafter described and claimed, the advantages of which will be obvious to those skilled in the art.

In the accompanying drawings,—

Fig. 1 is a small scale elevational view of a transmission embodying my invention;

Fig. 2 is an enlarged top plan view thereof;

Fig. 3 is a sectional elevational view taken on the line 3—3 of Fig. 2;

Figs. 4 and 5 are elevational views, taken at right angles, illustrating one of the carriers;

Fig. 6 is a fragmentary cross-sectional view taken on the line 6—6 of Fig. 1; and Fig. 7 is a fragmentary sectional view taken on the line 7—7 of Fig. 6.

Referring to these drawings, the driving and driven shafts are indicated at 10 and 11 respectively, the latter being rotatably supported by spaced brackets $a$ and $b$ on a suitable bed $c$ and the former by a bracket $d$ on bed $c$. These shafts may, of course, be supported by additional means, not associated with the transmission, and may extend to a distance from the transmission for connection to the source of power and to the driven mechanism.

Since my invention involves the displacement of the driving and driven elements in a plane normal to their axes, I provide a supplementary member for rotatably supporting one of the elements, which is so connected to its shaft as to permit the displacement described. Thus, for example, I provide an arm 12, which is mounted near one end on, and free to turn relatively to, the driven shaft 11 and on this arm, at a point intermediate its ends, is fixed a laterally projecting stud 13 upon which the driven element 14, herein shown as consisting of a toothed wheel or ratchet, is rotatably mounted. Fixed to ratchet 14 is a sprocket 15 which is connected by a chain 16 to a sprocket 17 fixed to shaft 11. The arm 12 is held from axial displacement on this shaft between the sprocket 17 and bracket $b$. It will be obvious that stud 13 may be moved up and down to permit substantially radial displacement relatively to the shaft 10 without interrupting the continuity of the drive to shaft 11 or requiring the latter to be displaced. For holding the stud 13 in the various positions, to which it may be moved, the other end of arm 12 is arranged to move adjacent the face of a bracket $e$ on bed $c$, which bracket has a slot 18 curved concentrically with the axis of shaft 11, and a stud 19 passes through slot 18 and arm 12 to clamp the latter to the bracket $e$. The slot 18 has sufficient range to permit the stud 13 to move from the illustrated, and its lowermost, position to a position wherein it lies on the opposite side of shaft 10 and at an equal distance therefrom.

The driving element, indicated at 20, is fixed to one end of shaft 10 and has one face disposed in adjacent relation to one face of the driving element 14. These elements are, however, spaced apart sufficiently to receive a series (four as shown) of carriers 21, having thin disc-like portions which are mounted face to face in substantially contiguous relation on stud 13 and are normally free to turn relatively thereto and relatively to the driven element 14. Also, a disc 22 is received between the elements and is secured to the end of stud 13 so that the carriers 21 are held against substantial axial displacement between this disc and one face of the driven element. One of the carriers is shown in full detail in Figs. 4 and 5 and as there shown, the carrier has an outwardly projecting portion which is built out laterally by a block or blocks 23 applied to one or both sides of the carrier according as is necessary in view of the particular location of the carrier on stud 13,—the object being to make the outwardly projecting portion of the carrier fill the space between the driving and driven elements. The faces of such portion of each carrier therefore lie flush, or substantially so, with the adjacent faces of the driving and driven elements.

Each carrier 21, as has been set forth, is rotatable relatively to one of the elements, as for example, the driven element, and each has to be so coupled with the other, and driving, element as to turn therewith and also be free for relative and substantially radial sliding movement. To this end, I provide on each carrier a cylindrical member, preferably in the form of a hollow bushing 24, which is fixed to the carrier, as by a drive fit, and extends through the driving element 20,—radial slots 25 being provided in the latter for this purpose. Mounted for free turning movement on bushing 24 is a member 26, in the shape of a rectangular block, which is slidingly engaged with the side walls of slot 25 and can move back and forth therein, as the element 20 turns, to permit the radial freedom described and yet cause the carrier 21 to turn with the element 20. A flange 27 is provided on bushing 24 and block 26 is held between this flange and the adjacent face of the carrier, or its block 23, against substantial movement in an axial direction. Block 26 may likewise be provided with flanges, as at 28, to engage the rear face of the driving element 20.

Each of the carriers 21 carries a device which can be engaged and coupled with the driven element 14 for an operable driving engagement. As shown, such device consists of a pawl 30 which is mounted to turn on a pin 29 fixed in the outwardly projecting portion of the carrier 21 and in its blocks 23. The pawls overlie the peripheral and toothed portion of the driven element 14 and each is provided with elastic means tending to move it in one direction, as into coupling engagement with such element. Thus, a spring 31, which is fixed in pin 29 and cooperates with the adjacent face of carrier 21 to hold the pawl 30 from substantial axial displacement on the pin, is bent to overlie the upper face of pawl 30, whereby the latter is yieldingly urged toward element 14.

For moving the pawls 30 in the opposite direction and causing them to be disengaged from the driven element 14 against the force of the elastic means 31, I provide cam controlled wedge pins 32 which are mounted to slide in the hollow bushings 24 and are movable in a direction parallel to the axis of the driving element 20. Each bushing 24 is made to extend beyond its carrier and to overlie and extend beyond the driven element 14 and, in its upper overlying portions, is provided with a transverse slot 33 of a width sufficient to receive pawl 30 and a depth sufficient to permit the lower surface of the pawl to be disposed substantially diametrically of the bushing. The wedge pins 32 have pointed ends 34 which engage the lower surfaces of the pawls 30 and function to raise the latter out of engagement with the driven element 14 when the pins are moved inwardly toward the pawls. For moving the wedge pins 32 inwardly, a face cam 35 is provided which is mounted on the inner end of the bearing $d$ for shaft 10. This end of the bearing is of reduced diameter and affords a shoulder 36, against which the cam is held by means to be described against axial displacement. The cam is preferably free to turn within limits on bearing $d$ for a reason to later appear. Each wedge pin 32 is provided at its other end with a suitable cam follower,—in this case an enlarged hemispherical end 38, between which and the flange 27 of bushing 24 a spring 39 is disposed to yieldingly hold the followers 38 in engagement with the face of cam 35.

The cam 35, as shown in Fig. 3, has a low dwell portion 40 which has an angular extent of substantially ninety degrees and a radial extent at least equal to the radial extent of slots 25. The radial center line of this dwell portion is disposed substantially at right angles to the line of centers connecting shaft 11 and stud 13 and is maintained in this relation, notwithstanding the movement of stud 13, by rocking the cam on its bearing $d$ by means to be later described. When the followers 38 are engaged with this dwell portion 40 of the cam, the wedge pins 32 are so positioned as to allow their pawls 30 to be coupled to the driven element 14. A high dwell portion 41 is provided over substantially the remainder of the face of cam 35 and, when the followers 38 are engaged with this portion, the wedge pins 32 hold their pawls 30 disengaged from the driven element 14. These dwell portions 40 and 41 are connected at their adjacent ends by a rise portion 42 and a drop portion 43.

For the purpose of rocking cam 35, the arm 12, which as described causes the displacement of the driven member 14, is provided with an upstanding arm 45. Fixed to the upper end of arm 45 and projecting laterally therefrom and rearwardly toward cam 35 is a member 46 which carries on its rear end a stud 47. A link 48 connects stud 47 to a similar stud 49 fixed to and projecting rearwardly from the cam 35.

The nature of the connection between the pawls 30 and the driving element is such that the latter can be driven only in one direction. This connection may, however, be made like that shown in my prior patent if a drive in reverse direction is desired.

In operation, the driving element 20 rotates in the direction of the arrow shown in Fig. 1 and carries with it the carriers 21 by reason of the connections therewith, comprising members 24 and 26, which permit relative radial displacement and sufficient relative angular freedom between the members 26 and the carriers to allow the former to slide freely in slots 25 at any of the positions which the carriers may assume. The carriers turn about the axis 13 of the driven element and, except when the axes 10 and 13 are in coincidence, the carriers necessarily move at non-uniform speed. A certain range of travel of each carrier can, however, be found in which the movement is substantially uniform and at least sufficiently uniform so as to not interfere with the practical utility of this form of transmission. Such a range is indicated in the present case by the low dwell portion 40 of cam 35 and as each carrier moves through this particular range in its travel it is allowed to drive the driven element. The number of carriers employed may vary as desired, so long as there are enough of them to permit one to become coupled to the driven element before the preceding one becomes disengaged therefrom.

As the element 20 rotates, each pawl becomes successively coupled to the driven element and drives it during an angular movement of ninety degrees and subsequently becomes uncoupled at about the time that a succeeding pawl becomes engaged with the driven element, or preferably shortly before this time. The speed variation is effected by the displacement of the axes 10 and 13. When these axes are in coincidence, a ninety degree movement of the driving element produces a ninety degree movement of that carrier, which has its pawl coupled to the driven element, and both elements move at equal speed. When these axes are positioned as shown in Fig. 1, a ninety degree movement of the driving element 20 produces a much smaller angular movement of the carrier which is doing the driving and a reduction of speed results. When, however, the axis 13 lies above the axis 10, a similar movement of the driving element produces a greater angular movement of the driving carrier and an increase in speed results.

The invention has been disclosed herein, in an embodiment at present preferred, for illustrative purposes but the scope of the invention is defined by the appended claims rather than by the foregoing description.

What is claimed is—

1. A variable speed transmission, comprising, driving and driven elements arranged face to face in adjacent relation, means to move said elements the one relatively to the other in a plane normal to their axes to vary the distance between such axes, a series of carriers between the elements and each mounted for turning movement about the axis of one thereof, gripping means mounted on each carrier and adapted to periodically connect with the driven element, a series of substantially radial slots one for each carrier provided in the driving element, a member slidably mounted in each slot, means connecting each member to its respective carrier so as to permit relative angular movement therebetween, and mechanism to cause said gripping means to be successively connected to and subsequently disconnected from the driven element.

2. A variable speed transmission, comprising, driving and driven elements arranged face to face in adjacent relation, means to move said elements the one relatively to the other in a plane normal to their axes to vary the distance between such axes, a series of carriers between the elements and each mounted for turning movement about the axis of one thereof, gripping means mounted on each carrier and adapted to periodically connect with the driven element, a series of substantially radial slots one for each carrier provided in the driving element, a member slidably mounted in each slot, a cylindrical member fixed to each carrier and extending through one of the first named members and having a rotatable engagement therewith, and mechanism to cause said gripping means to be successively connected to and subsequently disconnected from the driven element.

3. A variable speed transmission, comprising, driving and driven elements arranged face to face in adjacent relation, means to move said elements the one relatively to the other in a plane normal to their axes to vary the distance between such axes, a series of carriers between the elements and each mounted for turning movement about the axis of one thereof, gripping means mounted on each carrier and adapted to periodically connect with the driven element, a series of substantially radial slots one for each carrier provided in the driving element, a member slidably mounted in each slot, a hollowed tubular member fixed to each carrier and projecting through one of said slots, the first named member being mounted for turning movement on the last named member, and mechanism, including a part mounted for axial sliding movement in the last named member, to cause said gripping means to be successively connected to and subsequently disconnected from the driven element.

4. A variable speed transmission, comprising, driving and driven elements arranged face to face in adjacent relation, means to move said elements the one relatively to the other in a plane normal to their axes to vary the distance between such axes, a series of carriers between the elements and each mounted for turning movement about the axis of one thereof, each of said carriers having a part movable closely adjacent the adjacent face of the other element, gripping means mounted on each carrier and adapted to periodically connect with the driven element, a series of substantially radial slots one for each carrier provided in the driving element, a member slidably mounted in each slot, a cylindrical member fixed to each of said parts and projecting into one of said slots, said first named members being mounted one on each of said cylindrical members for relative turning movement and having one face contiguous with one face of said part on the adjacent carrier, a flange provided on each cylindrical member to engage the opposite face of that first named member on which it is mounted, and mechanism to cause said gripping means to be successively connected to and subsequently disconnected from the driven element.

5. A variable speed transmission, comprising, driving and driven elements arranged face to face in adjacent relation, means to move said elements the one relatively to the other in a plane normal to their axes to vary the distance between such axes, a series of carriers between the elements and each mounted for turning movement about the axis of one thereof, a series of angularly spaced and substantially radial slots provided in other of said elements, a series of members one for each carrier slidably mounted in said slots and disposed adjacent one face of its carrier, a series of hollow cylindrical members one for each carrier each extending through the adjacent sliding member and through and projecting beyond the other face of its carrier, a transverse slot provided in the projecting portion of each cylindrical member through the peripheral wall thereof, a pawl pivotally mounted on the last-named face of each carrier and having a part received in one of the last named slots, each of said pawls adapted to periodically engage the driven elements, a wedge pin slidably mounted in each cylindrical member and capable of engaging one of said pawls to control the movement of the latter into and out of engagement with the driven element, and means for successively causing said wedge pins to slide in their members to successively couple and uncouple each pawl with the driven element.

6. A variable speed transmission, comprising, driving and driven elements arranged face to face in adjacent relation, means to move said elements the one relatively to the other in a plane normal to their axes to vary the distance between such axes, a series of carriers between the elements and each mounted for turning movement about the axis of one thereof and slidable relative to the other element in a substantially radial direction, a member mounted on each carrier for movement into and out of coupling engagement with the driven element, and means for controlling said movement of said members and including a member slidably mounted in the driving element for movement in a direction parallel to the axis thereof.

7. A variable speed transmission, comprising, driving and driven elements arranged face to face in adjacent relation, means to move said elements the one relatively to the other in a plane normal to their axes to vary the distance between such axes, a series of carriers between the elements and each mounted for turning movement about the axis of one thereof and slidable relatively to the other element in a substantially radial direction, a member mounted on each carrier for movement into and out of coupling engagement with the driven element, and means for controlling said movement of said members and including a member slidably mounted in the driving element for movement in a direction parallel to the axis thereof, and a face cam mounted adjacent the driving element and arranged to periodically actuate the last named members on rotation of the driving element.

8. A variable speed transmission, comprising, driving and driven elements arranged face to face in adjacent relation, means to move said elements the one relatively to the other in a plane normal to their axes to vary the distance between such axes, a series of carriers between the elements and each mounted for turning movement about the axis of one thereof and slidable relatively to the other element, a pawl mounted on each carrier for movement into and out of coupling engagement with the driven element, elastic means for moving each pawl in one direction, a face cam adjacent the driving element, a wedge pin slidably mounted in each carrier and extending through the driving element and engaged with said cam, and slots provided in the driving element to receive said wedge pins and permit relative and substantially radial movement thereof, each of said wedge pins arranged to move its pawl in the other direction.

9. A variable speed transmission, comprising, driving and driven shafts, an element fixed to each thereof, one of said elements having a circular series of teeth, means to move said elements the one relatively to the other in a plane normal to their axes to vary the distance between such axes, a series of carriers rotatable relatively to the toothed element and radially slidable relatively to the other element but rotatable therewith, a pawl pivoted to each carrier, elastic means tending to force it toward and into engagement with the teeth on the toothed element, a face cam adjacent the other element, a wedge pin slidably mounted in each carrier and extending through the last named element for engagement with said cam, and slots provided in the last named element to receive said wedge pins and permit relative and substantially radial movement thereof, each of said wedge pins adapted to hold its pawl out of engagement with said toothed element and being periodically and successively allowed to move by said cam to release the pawl and permit it to be engaged with the toothed element by said elastic means.

In testimony whereof I have affixed my signature.

ELLSWORTH FREY.